United States Patent [19]

Magnuson

[11] 4,430,909

[45] Feb. 14, 1984

[54] DUAL OUTPUT STAGE FOR INTERNAL PLANETARY GEAR WINCHES

[75] Inventor: Roland A. Magnuson, King, Wash.

[73] Assignee: Paccar Inc., Bellevue, Wash.

[21] Appl. No.: 289,824

[22] Filed: Aug. 3, 1981

[51] Int. Cl.³ .............................................. F16H 37/06
[52] U.S. Cl. ........................................ 74/705; 74/789;
74/665 GA; 254/344
[58] Field of Search .................. 74/789, 705, 665 GA;
254/344

[56] References Cited

U.S. PATENT DOCUMENTS 3,055,237  9/1962  Magnuson ............................ 74/789

FOREIGN PATENT DOCUMENTS

| 104488 | 7/1938 | Australia | 74/705 |
|---|---|---|---|
| 1500472 | 9/1969 | Fed. Rep. of Germany | 74/665 |
| 46344 | | France | 74/705 |
| 371292 | 3/1907 | France | 74/705 |
| 771446 | 10/1934 | France | 74/705 |
| 1123021 | 9/1956 | France | 74/705 |
| 93072 | 7/1959 | Netherlands | 74/789 |

Primary Examiner—Allan D. Herrmann
Assistant Examiner—Wright D.
Attorney, Agent, or Firm—Seed and Berry

[57] ABSTRACT

The torque driving the final reduction in a planetary winch transmission is split, driving two final but separate output stages to a common ring gear of a drum or the like.

11 Claims, 8 Drawing Figures

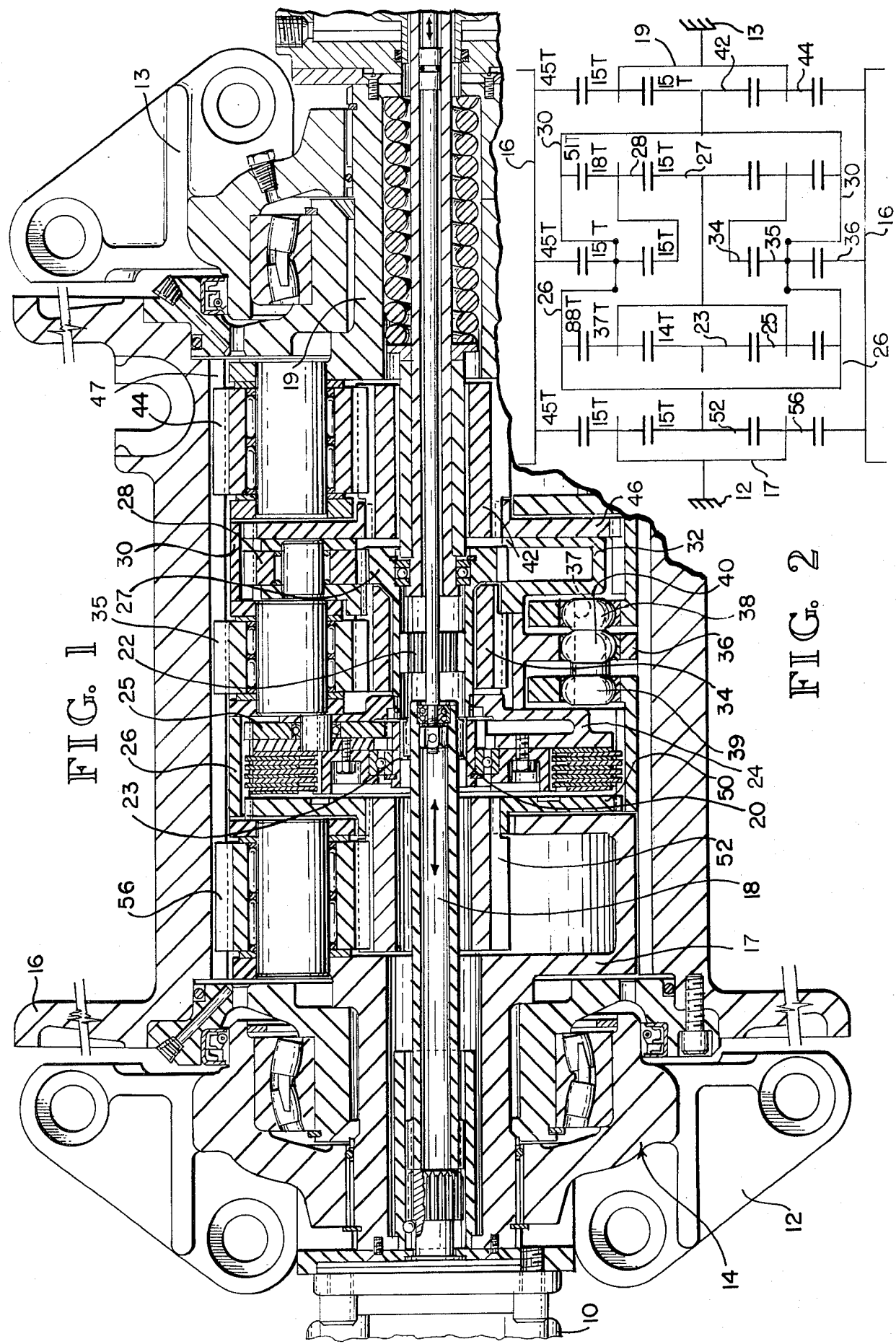

DUAL OUTPUT STAGE FOR INTERNAL PLANETARY GEAR WINCHES

DESCRIPTION

1. Technical Field

This invention pertains to planetary gear transmissions for winches or the like of the type in which the gearing is within the drum, and particularly to a winch which retains a given size but has a substantially increased torque capacity.

2. Background Art

For a given ring gear diameter, the practical limit of sun gear face width in the final output stage is the limiting factor in efforts to obtain maximum output torque. This assumes all other parameters, such as tooth pitch, tooth form, number of teeth, material and hardness, have already been optimized. This limit in face width is caused by deflections (wind-up) of the sun gear under load, which concentrates the tooth load to the input end of the gear. Thus, under conventional practice, unless the diameter of the transmission is substantially increased, it will achieve its maximum output torque capacity at a relatively low rating.

DISCLOSURE OF THE INVENTION

It is an object of this invention to provide a winch with higher line pull developed by internally geared transmissions within the winch drum for a given drum diameter.

It is another object of this invention to provide a planetary transmission with an output torque capacity, for a given outer diameter, twice that of conventional practice.

Basically, these objects are obtained by splitting the torque driving the final stage into two paths and then driving dual final output stages from these two paths for increasing the final output torque capacity.

BRIEF DESCRIPTION OF THE DRAWINGS

FIG. 1 is a longitudinal sectional view of a winch embodying the principles of the invention.

FIG. 2 is a schematic of a winch showing the number of teeth in the gears for a typical gear train embodying the principles of the invention.

BEST MODE FOR CARRYING OUT THE INVENTION

Figure 3:
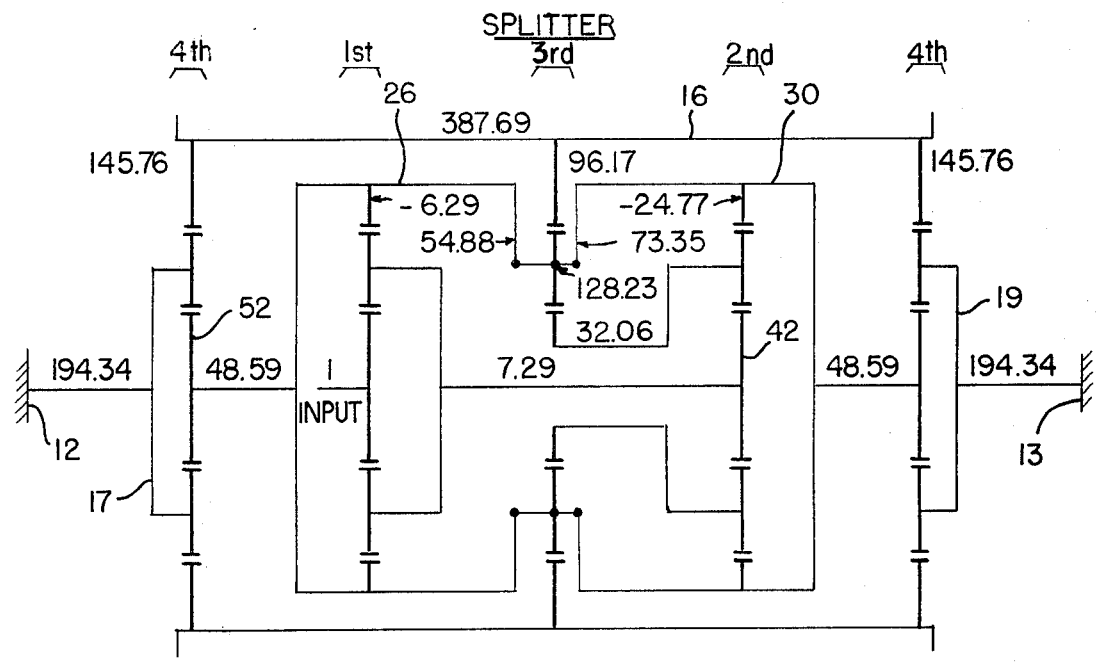
FIG. 3 is a schematic showing the cumulative gear ratios for the gear train of FIG. 2.

The winch embodying a transmission illustrating the principles of the invention includes a motor 10 coupled to a transmission 14 which, through several sets of planetary stage gearing, drives a driven member or driven output member, such as a drum 16 which is supported by two stationary mounts 12 and 13. Suitable hydraulic controls are provided for obtaining multiple speed ranges and braking, as is well known in the art. A typical winch having such controls and braking is illustrated in U.S. Pat. No. 3,055,237, the description of which is incorporated herein by reference thereto.

An input shaft 18 is driven by the motor and is shiftable axially. The input shaft has a spline 20 which can mesh with either a high gear spline 22 or a spline in a low gear or first stage sun 23. The first stage sun 23 meshes with a first stage planet 25, which meshes with a first stage ring gear 26.

The first stage carrier 24 is coupled to a second stage sun gear 27. The second stage sun gear 27 meshes with second stage planets 28, which mesh with the second stage ring gear 30. The second stage carrier 32 is coupled to third stage sun gear 34. The third stage sun gear drives third stage planets 35, which mesh with an internal ring gear 47 on the drum 16.

The output of third stage carrier 36 is divided between both fourth stage sun gears 42 and 52 by means of a central coupling such as self-aligning bearing 40, symmetrically, circumferentially spaced splitter beams or bars 37, and end couplings such as self-aligning bearings 38 and 39. Self-aligning bearing 39 is mounted in first stage ring 26, which is coupled by disk 50 to fourth stage sun gear 52, which meshes with planets 56, which drive ring gear 47 in drum 16. The torque reaction, which is one-half the drum torque, is transferred by the fourth stage carrier 17 through a splined connection to mount 12.

Self-aligning bearing 38 is mounted in second stage ring gear 30, which is coupled by disk 46 to fourth stage sun gear 42, which meshes with planets 44, which drive ring gear 47 in drum 16. The torque reaction, which is the other half of the drum torque, is transferred by the fourth stage carrier 19 through a splined connection to mount 13.

A unique feature of the invention when multiple planetary stages are employed is being able to use the ring gears of the higher speed stages for transmitting the torque driving the dual final stages. For this purpose, the drive from self-aligning bearing 39 is through the first stage ring gear 26. The drive self-aligning bearing 38 is through the second stage ring gear 30. Since the negative reaction of the second stage planet gears is at a higher torque than the first stage planet gears, bearing 36 is positioned off-center toward bearing 38 to obtain a more balanced output torque to each of the fourth stage sections. This balances or equalizes the torque loading on the teeth of both fourth stage sections, thus enabling a higher capacity torque output to the winch drum than if either one of the fourth stage output gears were carrying an unequal share of the load.

FIG. 2 illustrates schematically a cumulative ratio of the gear train. With this illustrative embodiment, a one hundred twenty thousand pound line pull can be obtained with the same gear sizes, hardness, tooth pitch, tooth form, number of teeth, and material equal to that of a standard sixty thousand pound line pull drum.

Figure 4:
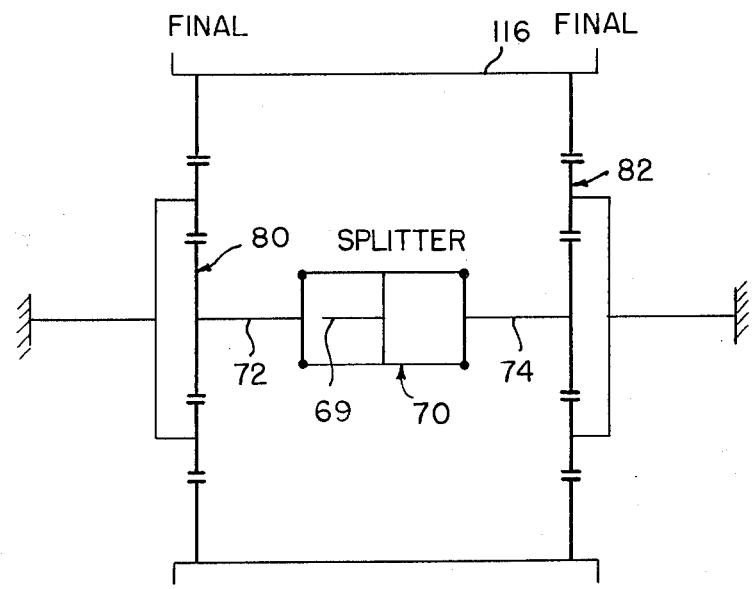
FIG. 4 is a simplified embodiment of a transmission embodying the principles of the invention.

FIG. 4 illustrates schematically the simplest form of the invention. It has an input 69, which can have a first stage of reduction, if desired, and two outputs or second stages 80 and 82 joined to the input by splitter mechanism 70. The splitter mechanism drives shafts 72 and 74, which drive the dual outputs. In this embodiment, coupling discs are positioned symmetrically on the splitter bars of mechanism 70 since there are no intermediate stage reactions to be supported.

Figure 4A:
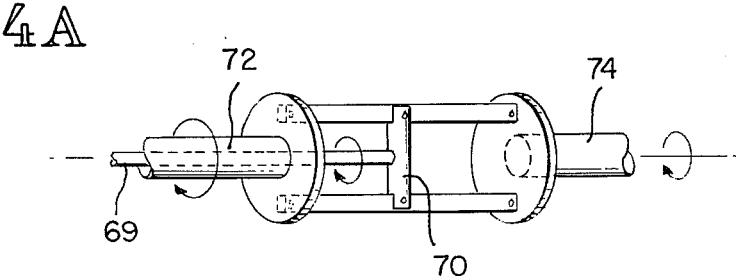
FIG. 4A is a shematic illustration of a portion of the transmission embodying the invention.

FIG. 4A illustrates schematically a splitter beam or mechanism 70 which shows the principle of dividing torque from an input 69 equally to driven shafts 72 and 74.

FIGS. 4 and 4A illustrate the simplest form of splitting a final stage into dual final or output stages. As mentioned earlier, additional reduction stages may be added prior to shaft 69. FIGS. 1–3 illustrate a more complicated planetary system in which additional stages are added between the input and the final stages. In FIGS. 1–3, the preliminary stages are on opposite sides of the splitter stage in a preferred manner. Thus the torque transfer is uniquely carried by the ring gears of the preliminary stages. It should be understood, however, that one preliminary stage or several preliminary stages may be stacked on one side of the split stage, thus allowing one direct coupling to the final output, as shown in FIG. 4, and one coupling to the other final output is through the ring gear or gears of the preliminary stages, as shown in FIGS. 1–3. When the torque transfer is through a preliminary stage or stages, a negative reaction torque is introduced and the center couplings for the splitter bars must be offset toward the couplings of the higher torque stage of the preliminary stages, as in FIGS. 1–3.

Figure 5:
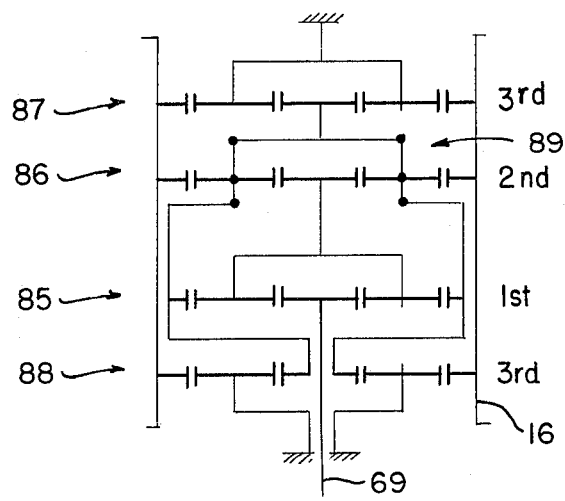
FIGS. 5-7 are schematic illustrations of other representative embodiments.

FIG. 5 illustrates and example of a transmission in which one side of the splitter mechanism is direct to a final drive but the other side of the splitter mechanism is through a ring gear of a preliminary stage. Input 69 drives the first stage 85, which drives the sun of second stage 86. The planet carrier of the second stage drives one final stage 87 directly, but the other final stage 88 must be driven through the preliminary first stage, which lies between the final stage 88 and the splitter mechanism 89. The coupling to the splitter bars from the planets of stage 86 are offset toward the couplings to the preliminary torque stage 85, as shown.

Figure 6:
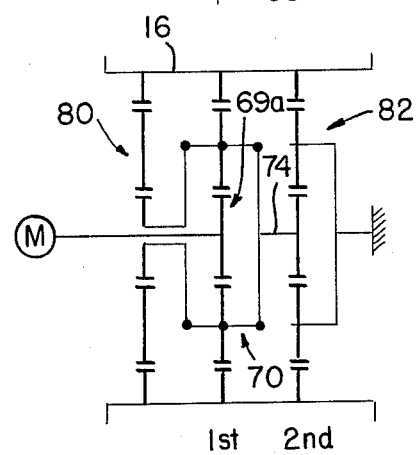

FIG. 6 illustrates another arrangement of a transmission similar to FIG. 4 but with the input 69 having a separate first stage planetary set 69a. As in FIG. 4, the splitter couplings are equally spaced since each of the reaction torques are equal.

Figure 7:
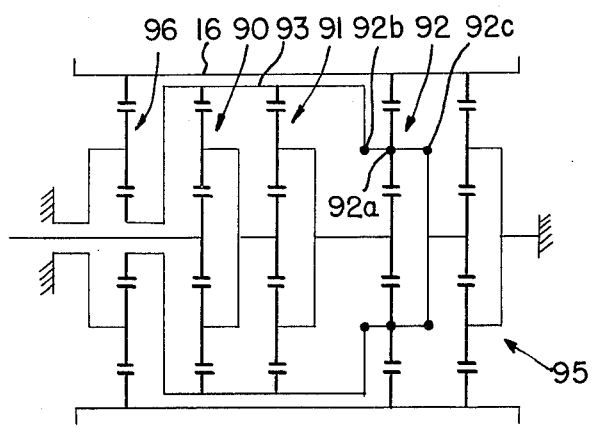

FIG. 7 illustrates another arrangement of a transmission similar to FIGS. 1–3 but with several preliminary stages 90 and 91 stacked on one side of the splitter mechanism 92. As in FIGS. 1–3, the splitter mechanism is in the third stage and the splitter bars have their center couplings 92a more closely spaced to couplings 92b than to couplings 92c. This is because the torque from the splitter must go through a common ring gear 93 of both stages 90 and 91 to get to final dual stage 92, and a negative reaction torque is then introduced. The coupling to dual final stage 95 is direct and does not introduce a negative reaction torque.

While a preferred embodiment of the invention has been illustrated and described, it should be understood that variations will be apparent to one skilled in the art without departing from the principles herein. Accordingly, the invention is not to be limited to the specific embodiment illustrated in the drawing.

I claim:

1. A planetary gear transmission having at least one input and an output coupled to a driven member, the improvement comprising a torque-splitting mechanism, driven by said one input, to split the torque from said one input and said output from said torque-splitting mechanism having dual, separate torque multiplication paths to said driven member for increasing the final output torque capacity to the driven member.

2. The transmission of claim 1, including dual planetary final output stages and a planetary intermediate stage, each of said planetary stages having a sun, planets, a planet carrier and a ring, said intermediate stage having said torque-splitting mechanism, said torque-splitting mechanism including circumferentially symmetrical splitter bars, central coupling means coupling said splitter bars to said intermediate stage, and first and second end coupling means coupling opposite ends of said splitter bars to said final output stages.

3. A transmission having an input, at least one preliminary planetary stage, dual planetary first and second final output stages, and a planetary intermediate stage, each of said planetary stages having a sun, planets, a planet carrier and a ring, said intermediate stage having a splitter mechanism including circumferentially symmetrical splitter bars, central coupling means coupling the splitter bars to said intermediate stage, first means coupling one of the ends of said splitter bars to the first final output stage, second means coupling the opposite ends of said splitter bars to said ring of the preliminary stage located between the second final output stage and the splitting mechanism and thence to the second final output stage, said central coupling means being spaced lengthwise along said bars between said first and second coupling means and offset toward the second coupling means coupling the splitter bars opposite ends to the preliminary stage ring.

4. The transmission of claim 3, including lower and higher torque preliminary stages located between said splitter mechanism and both said final output stages, said first and second coupling means including means coupling opposite ends of said splitter bars to the rings of said preliminary stages and thence to said final output stages, said central coupling means being located offset toward the coupling means joined to the higher torque preliminary stage.

5. The transmission of claim 3, including several preliminary stages being trapped stages located between a final output stage and the intermediate stage, said trapped stages having a common ring gear, said second coupling means connecting to said final output stage through said common ring gear, said central coupling means being spaced offset more closely to said end coupling means joined to the common ring gear for equalizing the torque to the final output stages.

6. A planetary transmission having a driven output member, comprising a first stage having a first sun, first planets, a first planet carrier and a first ring, a second stage having a second sun, second planets, a second planet carrier and a second ring, said second sun being driven by said first planet carrier, a third stage having a third sun, third planets, a third planet carrier and a third ring, said third sun being driven by said second planet carrier, said third planet carrier having symmetrically spaced splitter beams, central means coupling said splitter beams to said third planet carrier, and first and second end coupling means on said splitter beams on either side of said central coupling means, and dual fourth stages, each having a fourth sun, fourth planets, a fourth planet carrier, and a fourth ring gear coupled to said driven output member, said fourth suns each being drivingly coupled to a respective first and second stage ring, said first end coupling means coupling said splitter beams to said first stage ring, said second end couping means coupling said splitter beams to said second stage ring, said central coupling means being more closely spaced to said second end coupling means than to said first end coupling means.

7. A planetary transmission having a driven output member, comprising a first stage having a first sun, first planets, a first planet carrier and a first ring, a second stage having a second sun, second planets, a second planet carrier and a second ring said first ring being common with said second ring, said second sun being driven by said first planet carrier, a third stage having a third sun, third planets, a third planet carrier and a third ring, said third sun being driven by said second planet carrier, said third planet carrier having symmetrically spaced splitter beams, central means coupling said splitter beams to said third planet carrier, and first and second end coupling means on said splitter beams on either side of said central coupling means, and dual fourth stages, each having a fourth sun, fourth planets, a fourth planet carrier, and a fourth ring gear coupled to said driven output member, one said fourth sun being drivingly coupled to said first and second stage ring, said first end coupling means coupling said splitter beams to said first and second stage ring, said second end coupling means coupling said splitter beams to the other said fourth sun, said central coupling means being more closely spaced to said first end coupling means than to said second end coupling means.

8. The transmission of claim 1, said one input being an input gear, said torque-splitting mechanism transmitting torque directly to the dual, separate torque multiplication paths from said one input gear.

9. A planetary gear transmission having at least one sun gear forming part of a higher speed planetary gear set, said higher speed planetary gear set having said sun gear, planet gears, a planet carrier, and a ring gear;
a drum;
first and second separate lower speed gear sets;
a splitter mechanism comprising circumferentially symetrically spaced splitter bars each having two opposite first and second ends;
a central coupling member coupling the higher speed stage planetary gear set generally centrally to each of said splitter bars; and
end coupling members each coupling separate opposite ends of said splitter bars to said respective first and second lower speed gear sets.

10. The transmission of claim 9, said central coupling member being joined to the planet carrier of said higher speed planetary gear set.

11. The transmission of claim 9, said central coupling member being offset slightly toward one of the ends of said splitter bars to compensate for different torques in said lower-speed gear sets.

* * * * *